UNITED STATES PATENT OFFICE.

MAX DOHRN, OF BERLIN, GERMANY, ASSIGNOR TO CHEMISCHE FABRIK AUF ACTIEN (VORM. E. SCHERING), OF BERLIN, GERMANY.

2-NAPHTHYLQUINOLIN-4-CARBOXYLIC ACIDS.

1,197,462.

Specification of Letters Patent.

Patented Sept. 5, 1916.

No Drawing.

Application filed June 10, 1915. Serial No. 33,261.

*To all whom it may concern:*

Be it known that I, MAX DOHRN, doctor of philosophy, chemist, citizen of the German Empire, residing at Berlin, German Empire, have invented a new and useful Improvement in 2-Naphthylquinolin-4-Carboxylic Acids, of which the following is a specification.

This invention relates to the manufacture of the hitherto unknown 2-naphthylquinolin-4-carboxylic acids, which correspond to the formula

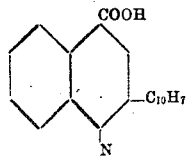

($C_{10}H_7$ meaning alpha- or beta-naphthyl) and possess valuable therapeutic properties, being especially good remedies against gout and rheumatism. These acids are crystalline compounds, being soluble in alcohol and alkalis, insoluble in benzene.

The process for preparing the new compounds consists in condensing isatin with acetonaphtons in alkaline solution or in condensing anilin with pyroracemic acid and naphthylaldehydes. In carrying out the processes I proceed as follows, the parts being by weight: 1.80 parts of isatin are dissolved in 500 parts of alcohol and 300 parts of potash lye (33 per cent.) and heated on the water bath for some hours with 90 parts of alpha-acetonaphton. The alcohol is then distilled off and the solution is neutralized with dilute hydrochloric acid. The product of reaction thus formed is precipitated from a solution of sodium carbonate and recrystallized from dilute alcohol. The 2.1'-naphthylquinolin-4-carboxylic acid crystallizes in yellowish red needles, which melt at about 198° C. In the same way, by using beta-acetonaphton instead of alpha-acetonaphton, the 2.2'-naphthylquinolin-4-carboxylic acid is obtained. This acid crystallizes in yellow crystals, which melt at about 234° C. 2.18 parts of anilin are warmed on the water bath with 30 parts of alpha-naphthylaldehyde in alcoholic solution. Then 16 parts of pyroracemic acid, preferably in alcoholic solution, are gradually added to the boiling solution. The mixture of reaction is further heated for some time and the 2.1'-naphthylquinolin-4-carboxylic acid is purified in the known manner.

By starting with beta-naphthylaldehyde the 2.2'-naphthylquinolin-4-carboxylic acid is obtained in an analogous way.

I claim as my invention:

As new products the 2-naphthylquinolin-4-carboxylic acids having the formula

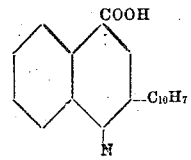

($C_{10}H_7$ meaning alpha- or beta-naphthyl), being soluble in alcohol and alkalis, insoluble in benzene, and possessing valuable therapeutic properties, substantially as described.

In testimony whereof I have hereunto set my signature in the presence of two subscribing witnesses.

DR. MAX DOHRN.

Witnesses:
HENRY HASPER,
WOLDEMAR HAUPT.